United States Patent
Oba

(10) Patent No.: US 9,948,804 B2
(45) Date of Patent: Apr. 17, 2018

(54) IMAGE FORMING APPARATUS AND INFORMATION PROCESSING METHOD CONTROLLING PRINTING FOR SEPARATING PRINTING PRODUCTS

(71) Applicant: CANON KABUSHIKI KAISHA, Tokyo (JP)

(72) Inventor: Yoshitaka Oba, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/402,834

(22) Filed: Jan. 10, 2017

(65) Prior Publication Data
US 2017/0223205 A1 Aug. 3, 2017

(30) Foreign Application Priority Data
Jan. 28, 2016 (JP) ................................. 2016-014704

(51) Int. Cl.
*G06F 3/12* (2006.01)
*H04N 1/00* (2006.01)

(52) U.S. Cl.
CPC ..... *H04N 1/00633* (2013.01); *H04N 1/00628* (2013.01); *H04N 1/00639* (2013.01); *H04N 2201/0094* (2013.01)

(58) Field of Classification Search
None
See application file for complete search history.

(56) References Cited

U.S. PATENT DOCUMENTS

| 2011/0229237 | A1* | 9/2011 | Hayashi | B65H 3/44 400/76 |
| 2011/0242584 | A1* | 10/2011 | Igarashi | G06F 3/1205 358/1.15 |
| 2013/0235411 | A1 | 9/2013 | Oba | |
| 2014/0139857 | A1* | 5/2014 | Maeda | H04N 1/0032 358/1.12 |
| 2014/0159304 | A1* | 6/2014 | Masuyama | G03G 15/6552 271/227 |
| 2014/0268197 | A1* | 9/2014 | Kametani | H04N 1/00633 358/1.12 |
| 2016/0124692 | A1* | 5/2016 | Nakatsu | G06F 3/1285 358/1.15 |

FOREIGN PATENT DOCUMENTS

JP 2002-374388 12/2002

* cited by examiner

*Primary Examiner* — Henok A Shiferaw
(74) *Attorney, Agent, or Firm* — Fitzpatrick, Cella, Harper & Scinto

(57) ABSTRACT

An image forming apparatus including: an image forming unit configured to form an image on a sheet; a plurality of discharge trays to which the sheet is discharged; a receiving unit configured to receive, from an external apparatus, print information including first image data, second image data, and discharge destination information that indicates a discharge destination of a printed product; and a control unit configured to control the image forming unit to form a first image on a first sheet for the printed product based on the first image data, and to form a second image on a second sheet for separating printed products based on the second image data, wherein the first sheet and the second sheet are discharged to one of the plurality of discharge trays that corresponds to the discharge destination set by the control unit based on the discharge destination information.

9 Claims, 10 Drawing Sheets

IMAGE FORMING APPARATUS AND INFORMATION PROCESSING METHOD CONTROLLING PRINTING FOR SEPARATING PRINTING PRODUCTS

BACKGROUND OF THE INVENTION

Field of the Invention

The present invention relates to an image forming apparatus configured to form an image on a sheet.

Description of the Related Art

In the field of production print that uses a laser printer, a digital multifunction peripheral, or a similar image forming apparatus, image forming apparatus to which a finisher equipped with stapling, hole punching, folding, book binding, and other multiple finishing functions can be connected are increasing in number in recent years. Finishers of this type have a plurality of discharge destinations for sheets in order to output a large amount of image data to a recording medium in an image forming apparatus. Some finishers output a sheet to a dedicated discharge destination that is not a normal discharge destination, depending on which finishing function is used.

In the case of outputting a plurality of copies for each of a plurality of printed products, an operator may have difficulties in finding where one printed product ends and another printed product starts when taking sheets from a discharge destination. In Japanese Patent Application Laid-Open No. 2002-374388, there is disclosed a technology capable of separating a printed product from another printed product with a colored sheet or a sheet for separating printed products, which has information on a printed product written thereon, in order to make it easier to see where one printed product ends and another printed product starts.

The related art, however, has a problem in that, depending on which finishing function is specified for a printed product, a sheet for separating printed products and the printed product are output to different discharge destinations due to a failure to match the discharge destination of the former and the discharge destination of the latter.

For instance, when a saddle stitching bookbinding process in which the finisher binds sheets folded in half is specified for a printed product, a sheet for separating printed products is output by following discharge destination information of initial settings that are set to the image forming apparatus. The printed product, on the other hand, is output to a discharge destination that is assigned to an output of the saddle stick bookbinding process. With the sheet for separating printed products and the printed product being output to different discharge destinations, the sheet for separating printed products does not fulfill its role of separating printed products from each other.

SUMMARY OF THE INVENTION

It is an object of the present invention to output a printed product and a sheet for separating printed products to the same discharge destination.

According to one embodiment of the present invention, there is provided an image forming apparatus comprising:

an image forming unit configured to form an image on a sheet;

a plurality of sheet discharge trays to which a sheet on which an image has been formed by the image forming unit is discharged;

a receiving unit configured to receive print information from an external apparatus, the print information including first image data, second image data, and discharge destination information that indicates a discharge destination of a printed product; and a control unit configured to control the image forming unit to form a first image on a first sheet for the printed product based on the first image data, which is included in the print information received by the receiving unit, and to form a second image on a second sheet for separating printed products based on the second image data, which is included in the print information received by the receiving unit, wherein the control unit obtains the discharge destination information from the print information received by the receiving unit, and sets the obtained discharge destination information as a discharge destination of both the first sheet and the second sheet, and wherein the first sheet and the second sheet are discharged to one of the plurality of sheet discharge trays that corresponds to the discharge destination set by the control unit.

Further features of the present invention will become apparent from the following description of exemplary embodiments with reference to the attached drawings.

DESCRIPTION OF THE EMBODIMENTS

Embodiments of the present invention will be described below with reference to the drawings.

First Embodiment (Overall Configuration)

Figure 1:
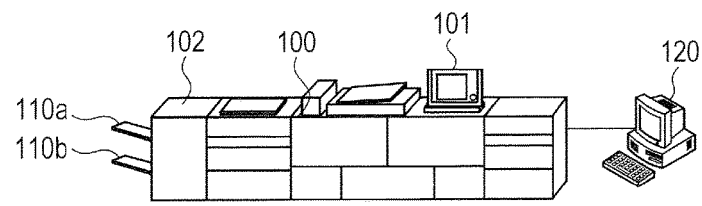
FIG. 1 is a diagram for illustrating an example of the overall configuration of an image forming apparatus.

FIG. 1 is a diagram for illustrating an example of the overall configuration of an electrophotographic image forming apparatus 100. The image forming apparatus 100 includes an operating unit 101, a finisher 102, and sheet discharge trays 110a and 110b. The image forming apparatus 100 is connected to an external apparatus 120 via an external interface (hereinafter abbreviated as I/F) 209, which serves as a receiving unit, in a manner that allows communication between the image forming apparatus 100 and the external apparatus 120. The operating unit 101 is, for example, an operator interface that includes a capacitive touch panel. Via the touch panel, the image forming apparatus 100 displays various types of information about the image forming apparatus 100 and receives an instruction input by an operator. The finisher 102 is, as described later, a unit configured to perform folding and various other types of finishing on a sheet that is a recording medium. The sheet discharge trays 110a and 110b are discharge destinations to which sheets are discharged from the image forming apparatus 100. The external apparatus 120 is an apparatus configured to generate print information 400, which is described later, from original data, for example, a personal computer or a print control apparatus. The external apparatus 120 is configured to receive print settings set by the operator, and to generate the print information 400 that includes the print settings. The print information 400 is code data (for example, page description language data) that represents an image. The external apparatus 120 is connected to the image forming apparatus 100 via the external I/F 209, which is described later, to transmit the generated print information 400 to the image forming apparatus 100.

(Hardware Configuration of Image Forming Apparatus 100)

Figure 2:
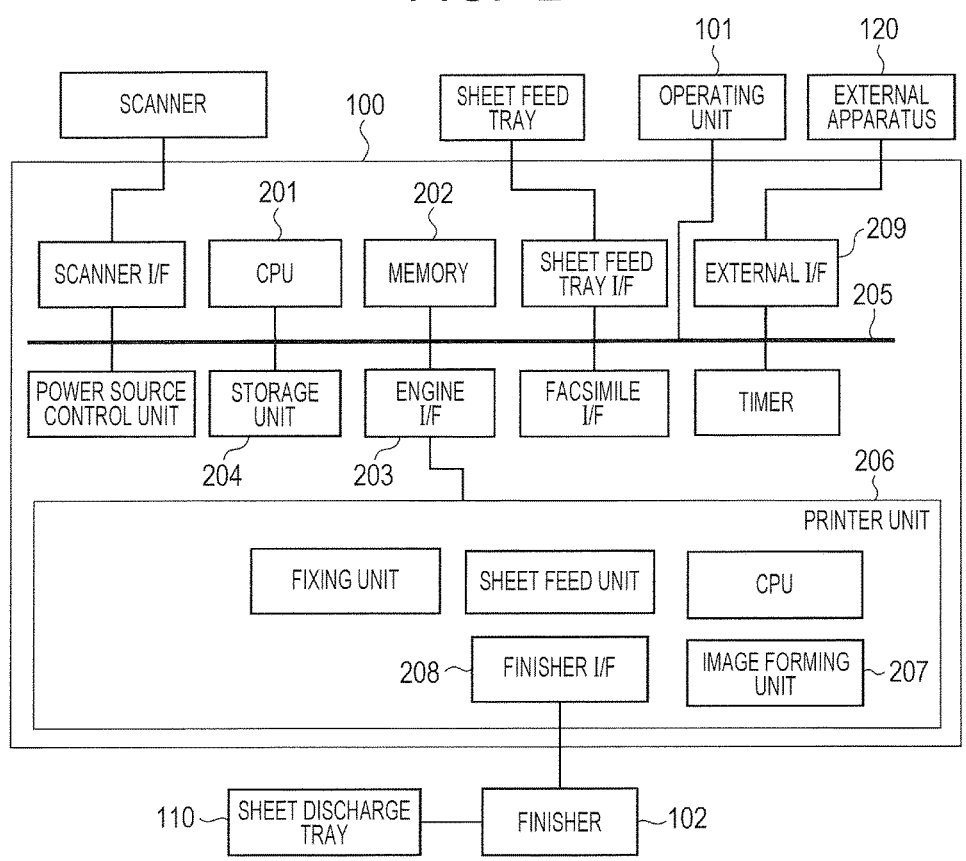
FIG. 2 is a diagram for illustrating an example of the hardware configuration of the image forming apparatus.

FIG. 2 is a diagram for illustrating an example of the hardware configuration of the image forming apparatus 100. The image forming apparatus 100 includes the operating unit 101, the finisher 102, the sheet discharge trays 110, a central processing unit 201 (hereinafter referred to as "CPU 201"), which serves as a control unit, a memory 202, an engine interface (hereinafter referred to as "engine I/F") 203, and a storage unit 204. The image forming apparatus 100 further includes a system bus 205 and a printer unit 206 among others. The printer unit 206 includes an image forming unit 207 configured to form an image on a sheet, a finisher interface (hereinafter referred to as "finisher I/F") 208, the external I/F 209, and others.

The finisher 102 is connected to the image forming apparatus 100 via the finisher I/F 208, and is configured to perform a finishing process such as folding on a sheet by following an instruction from the CPU 201. The finisher 102 then discharges the sheet on which the finishing process has been performed to one of the sheet discharge trays 110. The printer unit 206 is connected to the system bus 205 via the engine I/F 203. Image data is outputted to the printer unit 206 via the engine I/F 203 in response to an instruction from the CPU 201.

The image forming unit 207 is configured to deploy image data and code data received by the image forming apparatus 100 into an image that can be recorded on a sheet. For instance, to print the print information 400 (FIG. 4) of a printed product along with a sheet for separating printed products, which is described later, the image forming unit 207 first reads set values in print settings 401 of the sheet for separating printed products and print settings (discharge destination information) 403 of the printed product out of the received print information 400. The image forming unit 207 then reads image data 402 of the sheet for separating printed products and image data 404 of the printed product out of the print information 400, and deploys the read image data into images that can be recorded on sheets. The CPU 201 uses the deployed images and the read set values to perform a finishing process with the finisher 102, which outputs the result.

In a first embodiment of the present invention, the image forming unit 207 uses a discharge destination setting 421 extracted from the print settings 403 of the printed product to change a discharge destination setting 411 in the print settings 401 of the sheet for separating printed products so that the printed product and the sheet for separating printed products are output to the same discharge destination. Functions of the image forming apparatus 100 and processes described later with reference to FIG. 5, FIG. 7, FIG. 9, FIG. 11, and other flowcharts are implemented by the CPU 201 by reading onto the storage unit 204 programs that are stored in the memory 202 and executing the processes based on the read programs.

(Configuration of Finisher 102)

Figure 3:
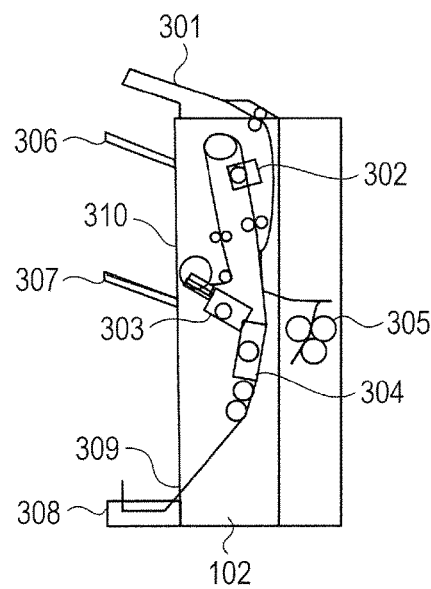
FIG. 3 is a diagram for illustrating an example of how a finisher looks in section.

FIG. 3 is a diagram for illustrating an example of how the finisher 102 looks in section. The configuration of the finisher 102 will be described with reference to FIG. 3. The finisher 102 includes, among others, an inserter 301, a punching unit 302, a stapler unit 303, a saddle stitching unit 304, a Z folding unit 305, movable trays 306 and 307, a bookbinding tray 308, and discharge ports 309 and 310. With the inserter 301, an already printed sheet can be fed as a book cover or a slip sheet, and can be conveyed without damage because the sheet does not travel through a sheet path of the printer unit.

When the finisher 102 is connected to the image forming apparatus, discharged sheets are stacked and sorted, and the sorted sheets are punched by the punching unit 302 and stapled together by the stapler unit 303 under instructions set by the operator. In the case where the finisher 102 is equipped with the Z folding unit 305, a sheet is conveyed to the Z folding unit to be folded in a zigzag pattern under instructions set by the operator. When the saddle stitching unit 304 is used, sheets are bound into a book under instructions set by the operator through a saddle stitching bookbinding process in which sheets are folded in half and the folded sheets are bound. In the case of a job that does not uses the saddle stitching unit 304, sheets pass through the discharge port 310 and are discharged to one of the movable trays 306 and 307. The movable trays 306 and 307 can both move up and down and, when a sheet is output to the movable tray 306, the movable tray 307 drops down to where the discharge port 310 is located. In the case of a job that uses the saddle stitching unit 304, sheets pass through the discharge port 309 and are discharged to the bookbinding tray 308.

(Data Structure of Print Information 400)

Figure 4:
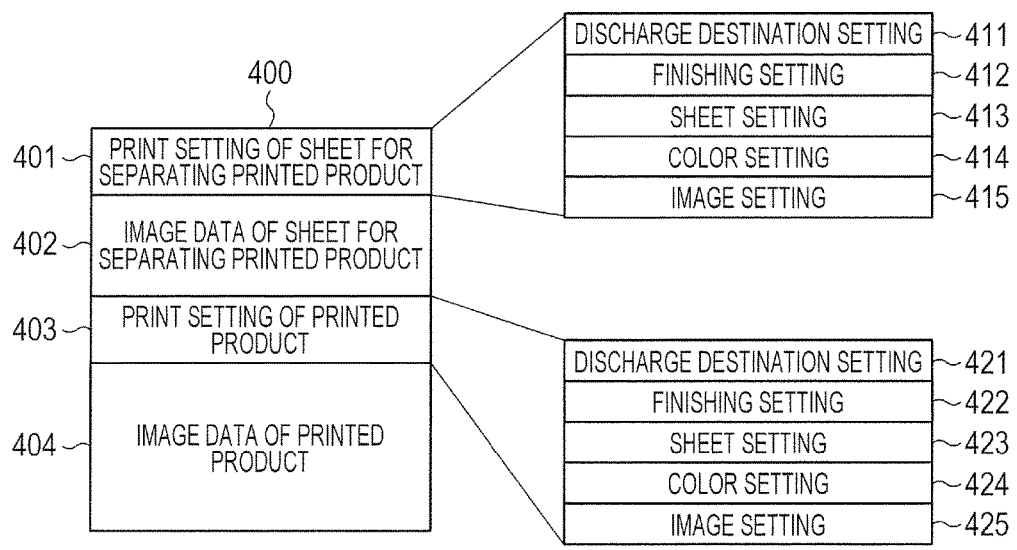
FIG. 4 is a diagram for illustrating an example of the data structure of print information.

FIG. 4 is a diagram for illustrating an example of the data structure of the print information 400. The print information 400 includes the print settings 401 of a sheet for separating printed products, the image data 402 of the sheet for separating printed products, the print settings 403 of a printed product, and the image data 404 of the printed product. The print settings 401 of a sheet for separating printed products are made up of set values such as the discharge destination setting 411, finishing settings 412, sheet settings 413, color settings 414, and image settings 415. The set values are set by the operator and, when the sheet for separating printed products is output, a finishing process and coloring process based on the set values are performed on the sheet for separating printed products. The image data 402 for the sheet for separating printed products is image data of an image in which output information of the printed product, for example, the job name and the number of copies to be printed, is written, and which is printed on the sheet for separating printed products.

The print settings 403 of a printed product is made up of set values such as the discharge destination setting 421, finishing settings 422, sheet settings 423, color settings 424, and image settings 425. The set values are set by the operator and, when the printed product is output, a finishing process and coloring process based on the set values are performed on the printed product. The image data 404 of the printed product is image data for the printed product. In the embodiment, the CPU 201 determines the discharge destination of a printed product from the discharge destination setting 421 included in the print settings 403 of the printed product, and changes the discharge destination setting 411 in the print settings 401 of the sheet for separating printed products so that the printed product and the sheet for separating printed products are output to the same discharge destination.

(Description of Flowchart of First Embodiment)

Figure 5:
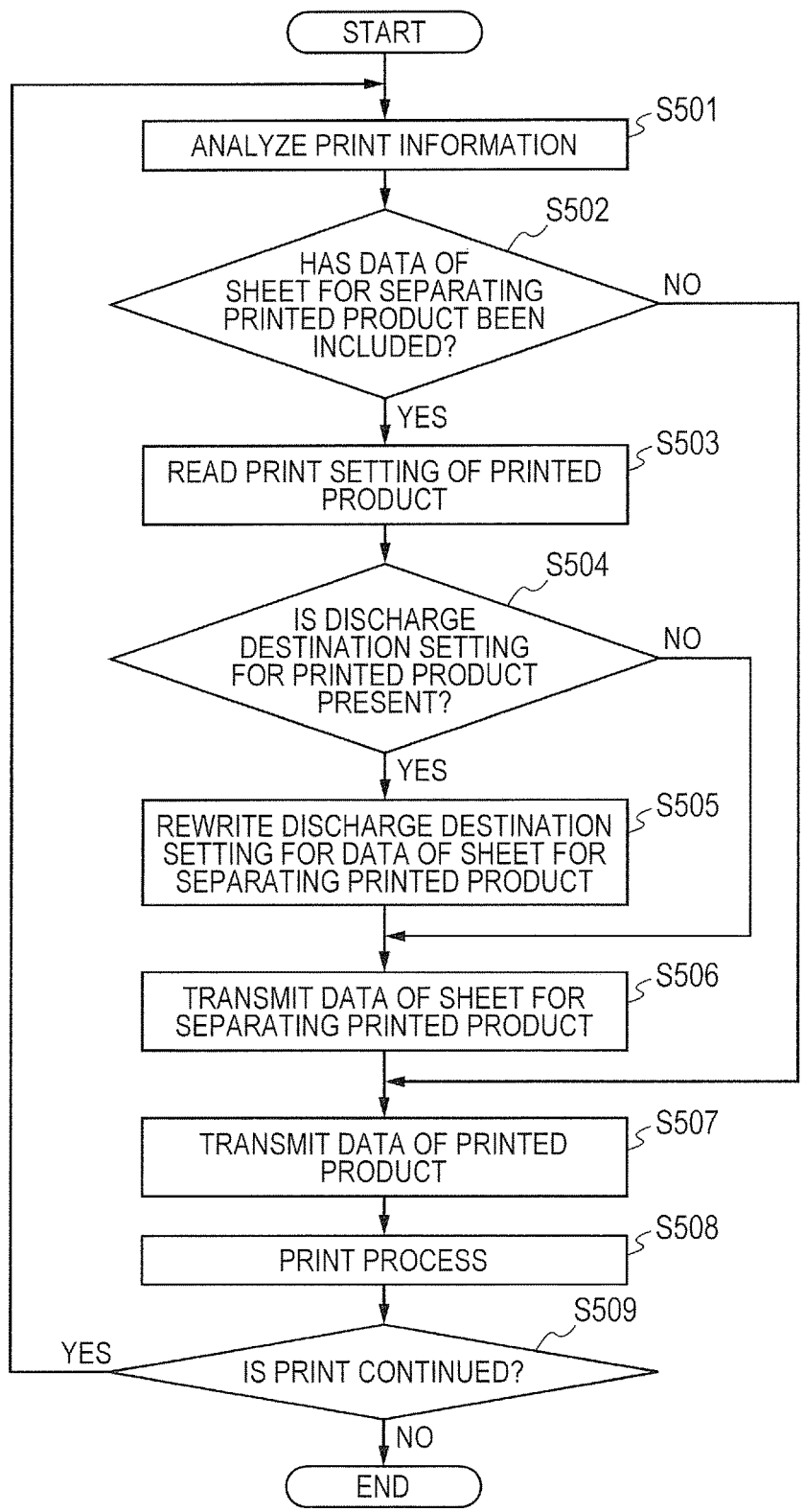
FIG. 5 is a flowchart for illustrating an example of information processing according to a first embodiment of the present invention.

An example of information processing of the image forming apparatus will be described with reference to a flowchart. FIG. 5 is a flowchart for illustrating an example of information processing according to the first embodiment. The processing illustrated in FIG. 5 is executed when the operator gives an instruction to print a sheet for separating printed products from the external apparatus 120 or from the operating unit 101. In S501, the CPU 201 analyzes the print information 400 that is received from the external apparatus 120, or the print information 400 that is created by the operator by operating the operating unit 101. The CPU 201 then proceeds to S502. In S502, the CPU 201 uses the result of the analysis in S501 to determine whether or not the received print information 400 includes data of a sheet for separating printed products. The CPU 201 proceeds to S503 when data of a sheet for separating printed products is included (YES in S502), and to S507 when data of a sheet for separating printed products is not included (NO in S502).

In S503, the CPU 201 reads the print settings 403 of a printed product out of data of the printed product that is included in the received print information 400. The CPU 201 then proceeds to S504. In S504, the CPU 201 reads the discharge destination setting 421 out of the print settings of the printed product that is read in S503. The CPU 201 proceeds to S505 in the case where a discharge destination is set (YES in S504), and to S506 in the case where no discharge destination is set (NO in S504). In S505, the CPU 201 uses the discharge destination setting 421 of the printed product that is read in S503 to rewrite the discharge destination setting 411 in the print settings 401 of the sheet for separating printed products. The CPU 201 then proceeds to S506.

In S506, the CPU 201 transmits the data of the sheet for separating printed products to the printer unit 206 via the engine I/F 203. The CPU 201 then proceeds to S507. The processing of S506 is an example of first transmission process. In S507, the CPU 201 transmits the data of the printed product to the printer unit 206 via the engine I/F 203. The CPU 201 then proceeds to S508. The processing of S507 is an example of second transmission process. In S508, the CPU 201 executes a print process for the received data of the sheet for separating printed products and the received data of the printed product, and then proceeds to S509. In S509, the CPU 201 determines whether or not printing is to be continued. The CPU 201 returns to S501 when printing is to be continued (YES in S509), and ends the information processing when printing is not to be continued (NO in S509).

Through the information processing described above, outputting a sheet for separating printed products and a printed product to the same discharge destination is accomplished by starting the print process for data of the sheet for separating printed products and data of the printed product after a print setting of the data of the printed product is reflected on the data of the sheet for separating printed products.

(Description on Output of Printing Printed Product Along with Sheet for Separating Printed Products According to First Embodiment)

Figure 6:
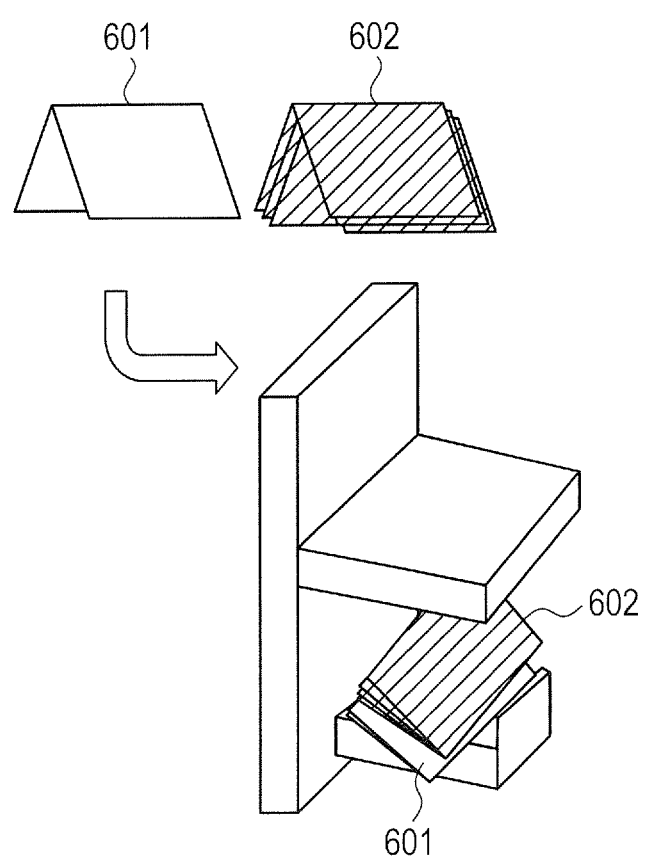
FIG. 6 is a diagram for illustrating an output result of printing a printed product along with a sheet for separating printed products according to the first embodiment.

Next, the output of printing a printed product along with a sheet for separating printed products will be described. FIG. 6 is a diagram for illustrating an output result of printing a printed product along with a sheet for separating printed products according to the first embodiment. A sheet 601 for separating printed products and a printed product 602 can be output to the same discharge destination by executing S501 to S509 with the CPU 201.

Second Embodiment

In the first embodiment, the CPU 201 uses print settings read out of data of a printed product to change the discharge destination setting of data of a sheet for separating printed products so that the discharge destination of the data of the sheet for separating printed products and the discharge destination of the data of the printed product match, thereby successfully discharging the sheet for separating printed products and the printed product to the same discharge destination. In a second embodiment of the present invention, whether a sheet for separating printed products and a printed product are discharged together to the same discharge destination or the sheet for separating printed products is discharged independently of the output destination of the printed product can be selected by an instruction from the operator. The CPU 201 stores the operator's instruction setting set via the external apparatus 120 or via the operating unit 101 in the discharge destination setting 411 of the print settings 401 of the sheet for separating printed products which is illustrated in FIG. 4, along with a discharge destination setting of the sheet for separating printed products. The processing executed by the CPU 201 is an example of first setting process. The CPU 201 can read the operator's instruction setting when processing the sheet for separating printed products.

(Description of Flowchart of Second Embodiment)

Figure 7:
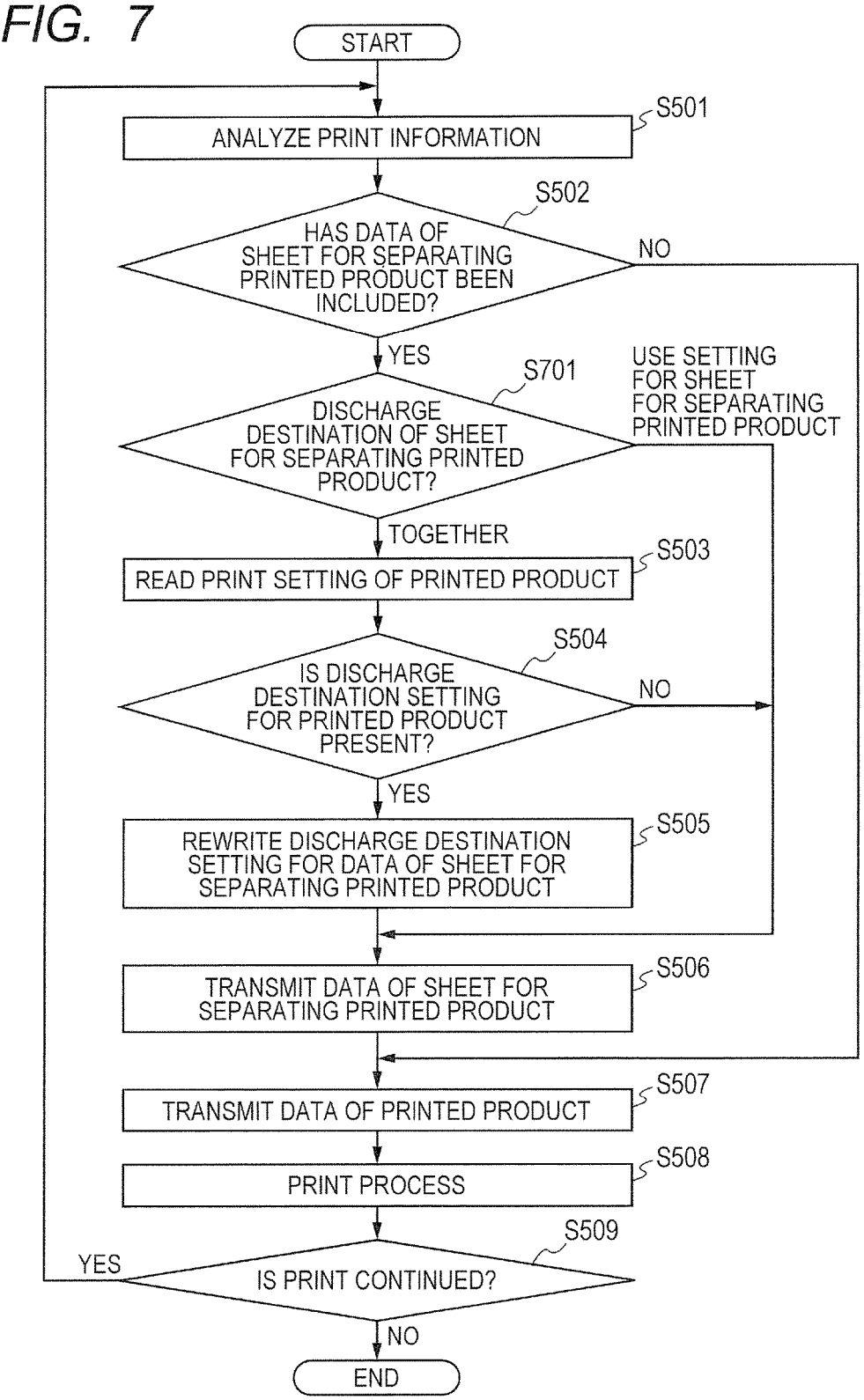
FIG. 7 is a flowchart for illustrating an example of information processing according to a second embodiment of the present invention.

FIG. 7 is a flowchart for illustrating an example of information processing according to the second embodiment. In FIG. 7, steps that are the same as ones of FIG. 5 are denoted by the same reference symbols, and descriptions thereof are omitted. The following description focuses on differences from the flowchart of FIG. 5 according to the first embodiment. In S502, the CPU 201 uses the result of the analysis of S501 to determine whether or not the received print information 400 includes data of a sheet for separating printed products. The CPU 201 proceeds to S701 when data of a sheet for separating printed products is included (YES in S502), and to S507 when data of a sheet for separating printed products is not included (NO in S502).

In S701, the CPU 201 reads the discharge destination setting 411 out of the print settings included in the received print information 400. The CPU 201 proceeds to S503 when the operator's instruction setting of the discharge destination setting 411 instructs the CPU 201 to output the sheet for separating printed products and the printed product together to the same discharge destination ("together" in S701). When the operator's instruction setting of the discharge destination setting 411 instructs the CPU 201 to give priority to a discharge destination setting that is set by the operator in advance for the sheet for separating printed products ("use setting for sheet for separating printed products" in S701), on the other hand, the CPU 201 proceeds to S506. The processing of S701 is an example of first determination process.

Through the information processing described above, outputting a sheet for separating printed products and a printed product to separate discharge destinations is accomplished by starting the print process for data of the sheet for separating printed products and data of the printed product without taking, as instructed by the operator's instruction setting, a step to make the discharge destination setting in the data of the printed product reflected on the data of the sheet for separating printed products. The information processing described above can also be used to successfully output a sheet for separating printed products and a printed product to the same discharge destination by starting the print process for data of the sheet for separating printed products and data of the printed product after the discharge destination setting in the data of the printed product is reflected on the data of the sheet for separating printed products.

(Description on Output of Printing Printed Product Along with Sheet for Separating Printed Products According to Second Embodiment)

Figure 8A:
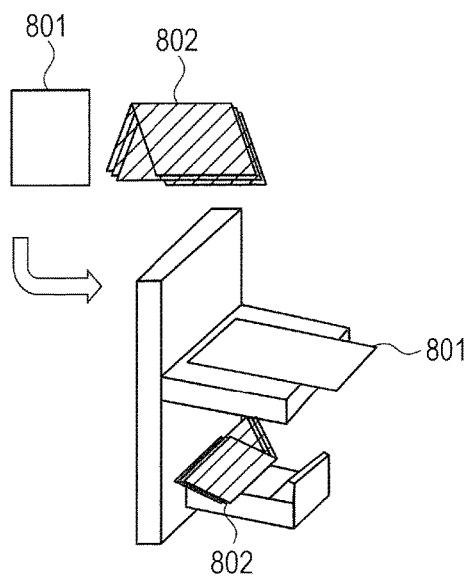
FIG. 8A and FIG. 8B are diagrams for illustrating output results of printing a printed product along with a sheet for separating printed products according to the second embodiment.
Figure 8B:
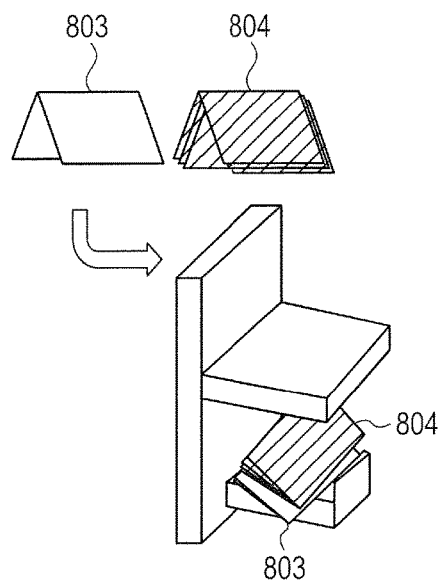

Next, the output of printing a printed product along with a sheet for separating printed products will be described. FIG. 8A and FIG. 8B are diagrams for illustrating output results of printing a printed product along with a sheet for separating printed products according to the second embodiment. A sheet 801 for separating printed products and a printed product 802 can be output to separate discharge destinations (FIG. 8A) or to the same discharge destination (FIG. 8B) by executing S501 to S509 and S701 with the CPU 201.

Third Embodiment

The discharge destination of a sheet for separating printed products can be selected in the second embodiment. In a third embodiment of the present invention, the orientation of a print surface of a sheet for separating printed products can be controlled by an instruction from the operator. The CPU 201 stores the operator's instruction setting set via the external apparatus 120 or via the operating unit 101 in the image settings 415 of a sheet for separating printed products and the image settings 425 of a printed product which are illustrated in FIG. 4. The processing executed by the CPU 201 is an example of second setting process. The CPU 201 can read the operator's instruction setting when processing the data of the sheet for separating printed products and the data of the printed product.

(Description of Flowchart of Third Embodiment)

Figure 9:
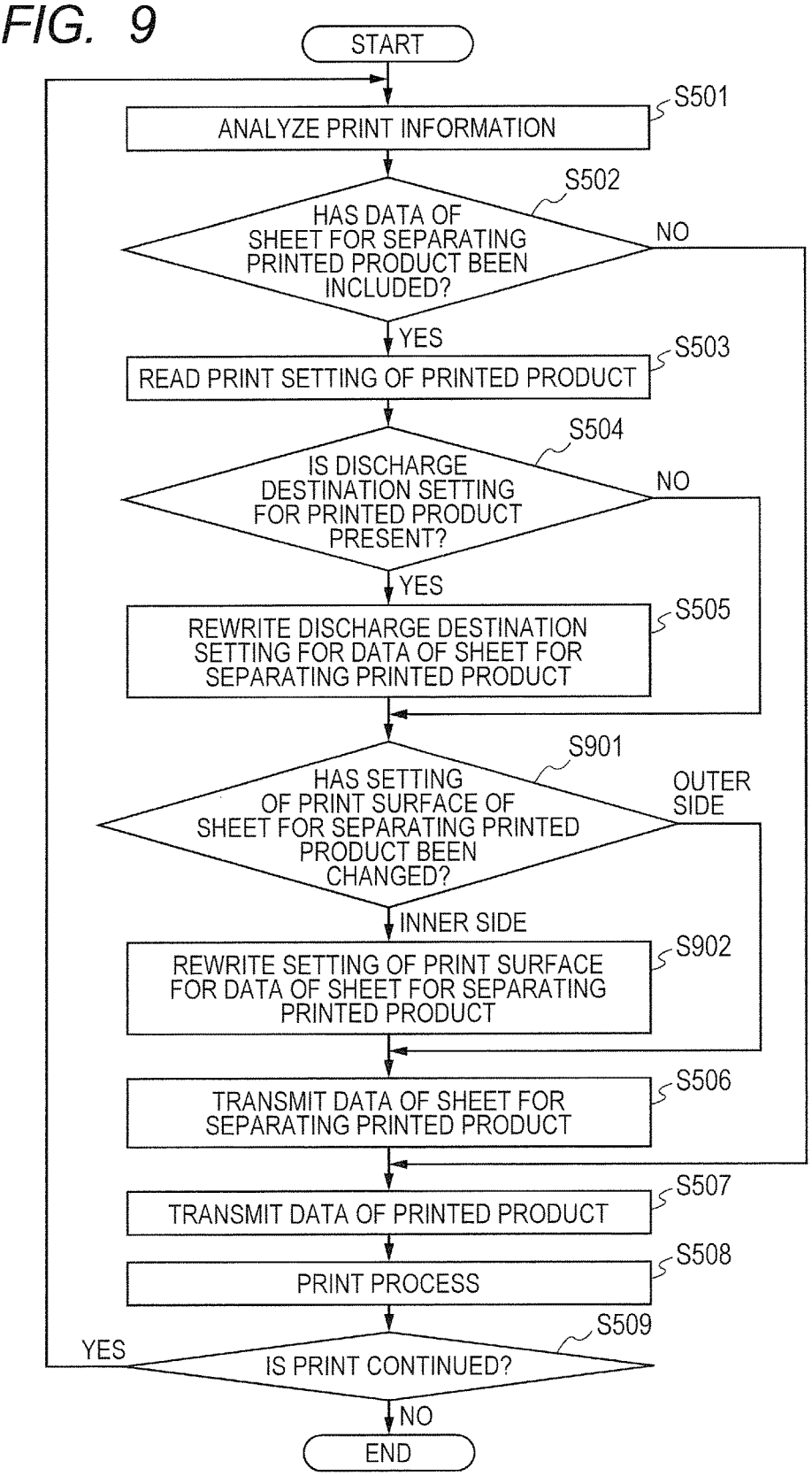
FIG. 9 is a flowchart for illustrating an example of information processing according to a third embodiment of the present invention.

FIG. 9 is a flowchart for illustrating an example of information processing according to the third embodiment. In FIG. 9, steps that are the same as ones of FIG. 5 are denoted by the same reference symbols, and descriptions thereof are omitted. The following description focuses on differences from the flowchart of FIG. 5 according to the first embodiment. After S505, the CPU 201 proceeds to S901. In S901, the CPU 201 determines what print surface setting is specified by the operator for the sheet for separating printed products. The CPU 201 proceeds to S902 when the inner side is specified as the print surface of the sheet for separating printed products ("inner side" in S901), and to S506 when the outer side is specified as the print surface of the sheet for separating printed products ("outer side" in S901). The processing of S901 is an example of second determination process for determining whether or not the print surface setting of a sheet for separating printed products is changed. In S902, the CPU 201 changes the print surface setting of the sheet for separating printed products (a setting indicating the side on which data is to be printed) as instructed by the operator. The CPU 201 then proceeds to S506. The processing of S902 is an example of first changing process for changing the print surface setting in data of a sheet for separating printed products when it is determined that the print surface setting of the sheet for separating printed products is changed.

Through the information process described above, the print surface of a sheet for separating printed products can be changed to the inner side or the outer side by making the operator's print instruction setting reflected on the print surface setting in data of the sheet for separating printed products.

(Description on Output of Printing Printed Product Along with Sheet for Separating Printed Products According to Third Embodiment)

Figure 10A:
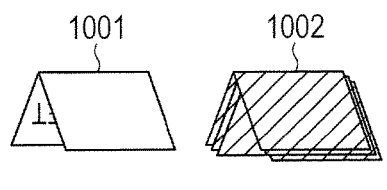
FIG. 10A and FIG. 10B are diagrams for illustrating output results of printing a printed product along with a sheet for separating printed products according to the third embodiment.
Figure 10B:
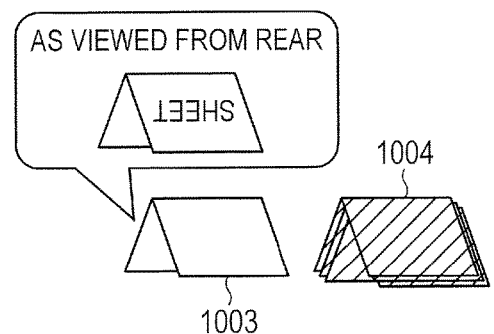

Next, the output of printing a printed product along with a sheet for separating printed products will be described. FIG. 10A and FIG. 10B are diagrams for illustrating output results of printing a printed product along with a sheet for separating printed products according to the third embodiment. A sheet 1001 for separating printed products and a printed product 1002 of FIG. 10A have print surfaces on the inner side. A sheet 1003 for separating printed products and a printed product 1004 of FIG. 10B have print surfaces on the outer side. The print surface of a sheet for separating printed products can be changed by executing S501 to S509 and S901 and S902 with the CPU 201.

Fourth Embodiment

The print surface of a sheet for separating printed products can be changed in the third embodiment. In a fourth embodiment of the present invention, the print orientation of a sheet for separating printed products can be changed. The CPU 201 stores the operator's instruction setting set via the external apparatus 120 or via the operating unit 101 in the image settings 415 of a sheet for separating printed products and the image settings 425 of a printed product which are illustrated in FIG. 4. The processing executed by the CPU 201 is an example of third setting process. The CPU 201 can read the operator's instruction setting when processing the data of the sheet for separating printed products and the data of the printed product.

(Description of Flowchart of Fourth Embodiment)

Figure 11:
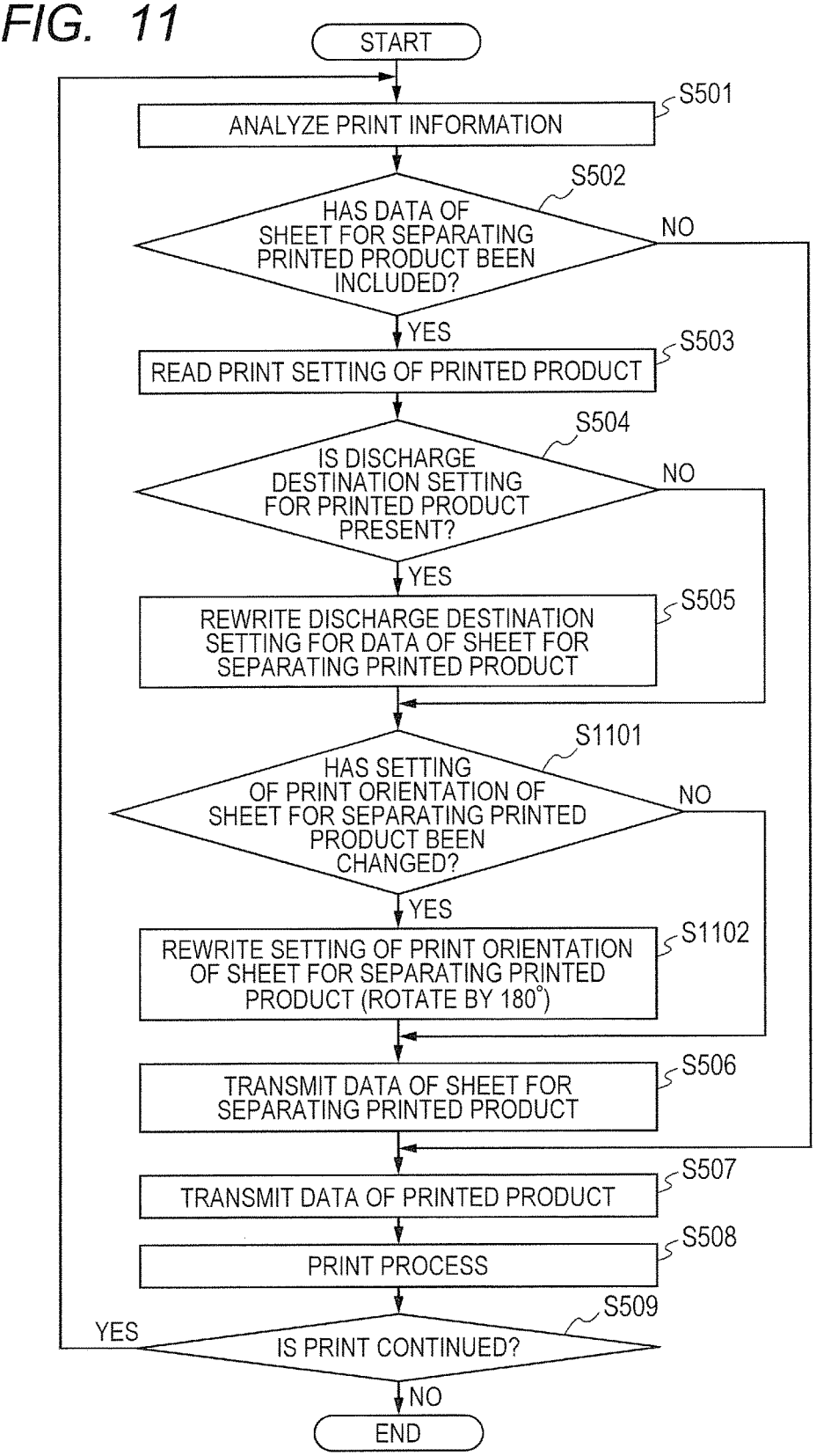
FIG. 11 is a flowchart for illustrating an example of information processing according to a fourth embodiment of the present invention.

FIG. 11 is a flowchart for illustrating an example of information processing according to the fourth embodiment. In FIG. 11, steps that are the same as ones of FIG. 5 are denoted by the same reference symbols, and descriptions thereof are omitted. The following description focuses on differences from the flowchart of FIG. 5 according to the first embodiment. In S504, the CPU 201 reads the discharge destination setting 421 out of the print settings of the printed product that are read in S503. The CPU 201 proceeds to S505 when a discharge destination is set for the printed product (YES in S504), and to S1101 when no discharge destination is set for the printed product (NO in S504). In S505, the CPU 201 uses the discharge destination setting 421 of the printed product that is read in S503 to rewrite the discharge destination setting 411 in the print settings 401 of the sheet for separating printed products. The CPU 201 then proceeds to S1101.

In S1101, the CPU 201 determines which set value ("face up" or "face down") is specified by the operator for the print orientation of the sheet for separating printed products. The CPU 201 proceeds to S1102 when the print orientation setting of the sheet for separating printed products is changed (YES in S1101), and to S506 when the print orientation setting of the sheet for separating printed products is not changed (NO in S1101). The processing of S1101 is an example of third determination process for determining whether or not the print orientation of a sheet for separating printed products is changed.

In S1102, the CPU 201 sets the rotation of the print orientation by 180 degrees in the data of the sheet for separating printed products in order to change the print orientation of the sheet for separating printed products as instructed by the operator, and then proceeds to S506. The processing of S1102 is an example of second changing process for changing the print orientation in the data of the sheet for separating printed products when it is determined that the print orientation of the sheet for separating printed products is changed.

Through the information processing described above, the print surface setting of a sheet for separating printed products can be changed to "face up" when the print surface is "face down" by accident, by making the operator's instruction reflected on the print orientation setting in data of the sheet for separating printed products.

(Description on Output of Printing Printed Product Along with Sheet for Separating Printed Products According to Fourth Embodiment)

Figure 12A:
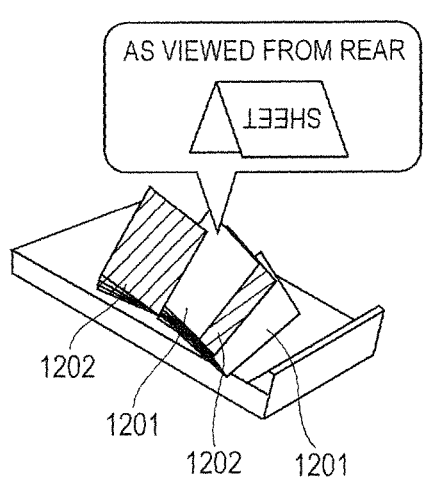
FIG. 12A and FIG. 12B are diagrams for illustrating output results of printing a printed product along with a sheet for separating printed products according to the fourth embodiment.
Figure 12B:
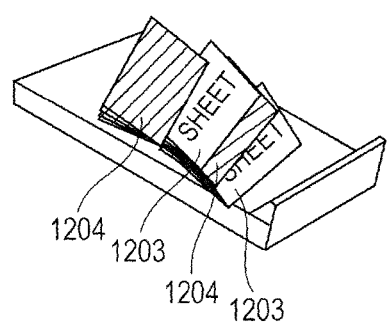

Next, the output of printing a printed product along with a sheet for separating printed products will be described. FIG. 12A and FIG. 12B are diagrams for illustrating output results of printing a printed product along with a sheet for separating printed products according to the fourth embodiment. The print orientation of a sheet 1201 for separating printed products and a printed product 1202 of FIG. 12A is face down. The print orientation of a sheet 1203 for separating printed products and a printed product 1204 of FIG. 12B is face up. The print orientation of a sheet for separating printed products can be changed by executing S501 to S509 and S1101 and S1102 with the CPU 201.

A detailed description is given above on exemplary embodiments of the present invention. However, the present invention is not limited to the particular embodiments. For instance, processes of a plurality of embodiments out of the described embodiments may be combined at discretion. The overall configuration of the image forming apparatus 100 that is illustrated in FIG. 1 is given as an example, and the image forming apparatus 100 may have a plurality of operating units. The hardware configuration of the image forming apparatus 100 that is illustrated in FIG. 2 is given as an example, and the image forming apparatus 100 may have a plurality of pieces of the same component, for example, the CPU.

According to the information processing of the embodiments described above, a sheet for separating printed products and a printed product can be output to the same discharge destination.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-014704, filed Jan. 28, 2016, which is hereby incorporated by reference herein in its entirety.

What is claimed is:
1. An image forming apparatus comprising:
an image forming member that forms an image on a sheet;
a plurality of sheet discharge trays to which a sheet on which an image has been formed by the image forming unit is discharged;
a receiving interface that receives print information from an external apparatus, the print information including first image data, second image data, first discharge destination information that indicates a discharge destination of a first sheet for a printed product, and second discharge destination information that indicates a discharge destination of a second sheet for separating the printed product; and
a processor that controls the image forming member to form a first image on the first sheet based on the first image data, which is included in the print information received by the receiving interface, and to form a second image, including information about the printed product comprising the first sheet, on the second sheet based on the second image data, which is included in the print information received by the receiving interface,
wherein the processor obtains the first discharge destination information from the print information received by the receiving interface, and rewrites the second dis- charge destination information into the obtained first discharge destination information, and wherein the first sheet for the printed product and the second sheet on which the second image including the information about the printed product comprising the first sheet is formed are discharged to one of the plurality of sheet discharge trays that corresponds to the first discharge destination.

2. An image forming apparatus according to claim 1, further comprising a saddle stitching bookbinding device configured to fold, in a middle, sheets that are supplied from the image forming apparatus and to bind the middle of the folded sheets.

3. An image forming apparatus according to claim 1, wherein the processor determines whether or not discharging the first sheet and the second sheet to the same discharge destination is set, and wherein the processor rewrites, when it is determined that discharging the first sheet and the second sheet to the same discharge destination is set, the second discharge destination information, based on the first discharge destination information that indicates the discharge destination of the printed product in the print information.

4. An image forming apparatus according to claim 3, wherein the processor further sets whether or not the first sheet and the second sheet are to be discharged to the same discharge destination.

5. An image forming apparatus according to claim 1, wherein the processor determines whether or not a print surface setting of the second sheet is to be changed, and wherein the processor changes the print surface setting of the second sheet when it is determined that the print surface setting of the second sheet is to be changed.

6. An image forming apparatus according to claim 5, wherein the processor further sets whether or not the print surface setting of the second sheet is to be changed.

7. An image forming apparatus according to claim 1, wherein the processor determines whether or not a print orientation of the second sheet is to be changed, and wherein the processor changes the print orientation of the second sheet when it is determined that the print orientation of the second sheet is to be changed.

8. An image forming apparatus according to claim 7, wherein the processor further sets whether or not the print orientation of the second sheet is to be changed.

9. An information processing method, which is executed by an image forming apparatus, the information processing method comprising:

receiving print information from an external apparatus, the print information including first image data, second image data, first discharge destination information that indicates a discharge destination of a first sheet for a printed product, and second discharge destination information that indicates a discharge destination of a second sheet for separating the printed product;

forming a first image on the first sheet based on the first image data;

forming a second image, including information about the printed product comprising the first sheet, on the second sheet based on the second image data;

obtaining the first discharge destination information from the print information;

rewriting the second discharge destination information into the first discharge destination information; and discharging the first sheet for the printed product and the second sheet, on which the second image including the information about the printed product comprising the first sheet is formed, both to one of a plurality of sheet discharge trays that corresponds to the first discharge destination.

* * * * *